United States Patent [19]

Kyriakos et al.

[11] Patent Number: 5,008,844
[45] Date of Patent: Apr. 16, 1991

[54] COLLISION AVOIDANCE TRANSMIT SYSTEM WITH AUTOCALIBRATION

[75] Inventors: Constantinos S. Kyriakos, Boca Raton; Henri Baran, Coral Springs, both of Fla.

[73] Assignee: Allied-Signal Inc., Morris Township, Morris County, N.J.

[21] Appl. No.: 463,181

[22] Filed: Jan. 10, 1990

[51] Int. Cl.$^5$ ............................ G01S 7/40; G01S 3/02
[52] U.S. Cl. ............................... 364/571.05; 364/461; 342/174; 342/455
[58] Field of Search ................... 340/870.04; 342/165, 342/174, 455; 364/461, 571.01, 571.02, 571.05, 571.04

[56] References Cited

U.S. PATENT DOCUMENTS

| | | | |
|---|---|---|---|
| 2,870,402 | 1/1959 | Corr et al. | 342/174 |
| 3,145,132 | 7/1965 | Battle, Jr. et al. | 342/174 |
| 4,053,890 | 10/1977 | Woodsow, III et al. | 342/174 |
| 4,488,155 | 12/1984 | Wu | 342/174 |
| 4,538,150 | 8/1985 | Boone, Jr. | 342/174 |
| 4,855,748 | 8/1989 | Brandao et al. | 364/461 |
| 4,862,396 | 8/1989 | Wirumandrad | 364/571.02 |
| 4,914,733 | 4/1990 | Gralnick | 364/461 |
| 4,924,232 | 5/1990 | Hudson et al. | 342/174 |
| 4,947,176 | 8/1990 | Inatsune et al. | 342/165 |

Primary Examiner—Salvatore Cangialosi
Attorney, Agent, or Firm—Howard G. Massung; Robert A. Walsh

[57] ABSTRACT

A transmit system for collision avoidance systems having autocalibration. A four element antenna array is provided. Each element is selectively connectable to a transmitter through a power divider and a isolator. Three of the elements further have a programmable phase shifter in line to the transmitter. A phase detector having a first input selectably connectable to one of the elements and a second output connected to the transmitter is provided. By selectively connecting one element to the transmitter and one element to the phase detector and then selectively programming the appropriate phase shifters, the differentiated phase delay in each channel of components associated with an antenna element can be calibrated.

12 Claims, 5 Drawing Sheets

COLLISION AVOIDANCE TRANSMIT SYSTEM WITH AUTOCALIBRATION

BACKGROUND OF THE INVENTION

This invention relates to a multi-element antenna transmit system for aircraft collision avoidance. More specifically, it relates to method and apparatus for calibrating differential cable delays in the antenna transmit system of a Traffic/alert Collision Avoidance System (TCAS).

The TCAS equipment located aboard a protected aircraft periodically transmits interrogation signals which are received by transponders located aboard other aircraft — hereinafter referred to as target aircraft — in the vicinity of the protected aircraft These transponders are preferably Mode S altitude reporting transponders so that TCAS capabilities can be fully exploited. In reply to the interrogation signals, the target aircraft's transponder transmits a response signal. The TCAS equipment aboard the protected aircraft determines the range of the target aircraft by using the round trip time between transmission of the interrogation signal and receipt of the response signal. In addition, if a Mode S transponder is used in the target aircraft, the protected aircraft can determine the altitude of the target aircraft from the response signal contents.

The TCAS typically uses a multi-element antenna array, for example, a four element array having each element arranged at 90° spacing around the circumference of the array. Various components in the TCAS equipment, such as cables and receivers, are interfaced to each antenna element. The signals to be transmitted by an antenna element are delayed in phase as a result of passing through these components. The differential delays resulting from the components must be calibrated out to obtain accurate results.

A transmit system having autocalibration for use in a collision avoidance system, therefore, is needed.

SUMMARY OF THE INVENTION

The present invention is a collision avoidance transmit system having autocalibration capabilities. The system includes a four element antenna array, a transmitter and a phase detector. The transmitter output is connected to a first input of the phase detector. A first and a third element in the array are oppositively positioned. Similarly, a second and a fourth element in the array are oppositively positioned. The first element in the array is selectively connectable to the transmitter or to a second input of the phase detector through a first channel. The second, third and fourth elements in the array are each selectively connectable to the transmitter or to the second input of the phase detector through a second, a third and a fourth channel, respectively. The second, third and fourth channels each include a programmable phase shifter.

In accordance with a preferred calibration method, the phase difference between the first and third channels is determined by transmitting a signal between the first element and the second element to obtain a first phase detector output, by transmitting the signal between the third element and the second element to obtain a second phase detector output and by inserting a first phase shift in the third channel such that the first and second phase detector outputs are equal. Then the signal is transmitted between the first element and the fourth element to obtain a third phase detector output. The signal is transmitted between the third element and the fourth element to obtain a fourth phase detector output and a second phase is inserted in the third channel such that the third and fourth phase detector outputs are equal. A third phase shift is determined by averaging the first and second phase shift.

The phase difference between the second and fourth channel is determined by transmitting a signal between the second element and the first element to obtain a fifth phase detector output, by transmitting the signal between the fourth element and the first element to obtain a sixth phase detector output and by inserting a fourth phase shift in the fourth channel such that the fifth and sixth phase detector outputs are equal. Then the signal is transmitted between the second element and the third element to obtain a seventh phase detector output, the signal is transmitted between the fourth element and the third element to obtain an eighth phase detector output and a fifth phase shift is inserted in the fourth channel such that the seventh and eighth phase detector outputs are equal. A sixth phase shift is determined by averaging the fourth and fifth phase shifts.

Then a signal is transmitted between the third element and the first element with the third phase shift inserted into the third channel to obtain a ninth phase detector output. The signal is also transmitted between the fourth and second elements with the sixth phase shift inserted into the fourth channel to obtain a tenth phase detector output. A seventh phase shift is inserted in the second channel such that the ninth and tenth phase detector outputs are equal.

After determining an eighth phase shift which is one half the seventh phase shift and determining a ninth phase shift which is the sixth phase shift plus the eighth phase shift, a collision avoidance signal is transmitted from the four element antenna array with the eighth phase shift inserted in the second channel, the third phase shift inserted in the third channel and the ninth phase shift inserted into the fourth channel.

DESCRIPTION OF THE PREFERRED EMBODIMENT

Figures 1, 2:
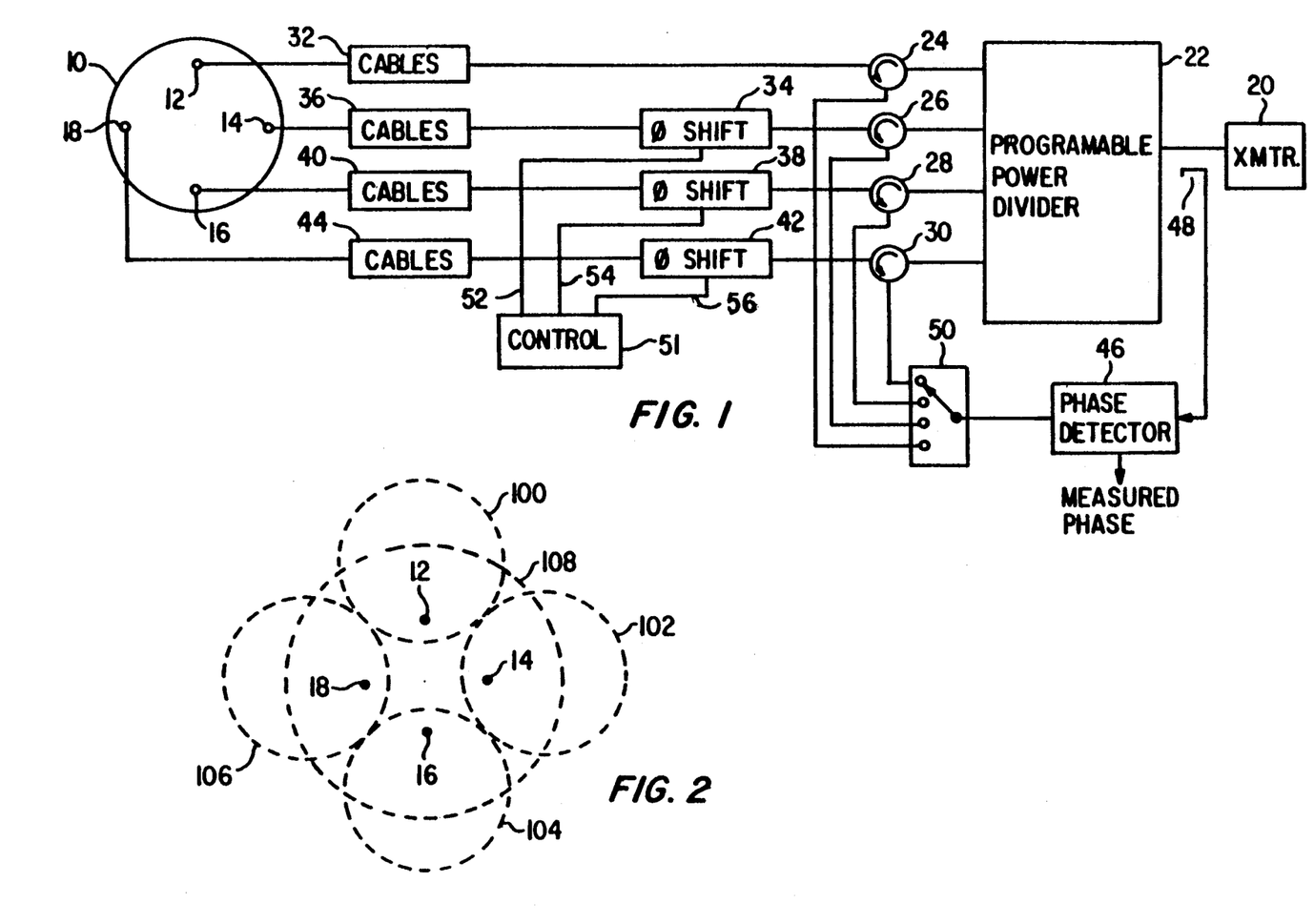
FIG. 1 illustrates a preferred four element antenna array and transmitter/receiver for use in a collision avoidance system.
FIG. 2 illustrates preferred beam patterns formed by selectively energizing the elements of the antenna system of FIG. 1.

FIG. 1 illustrates a preferred four element antenna system having directional transmit capabilities. The antenna array 10 has four selectively energizable elements 12, 14, 16 and 18 which are preferably arranged in quadrature about an array circumference (ie. with 90° circumferential spacing). Therefore, the elements 12 and 16 are aligned on a first axis and the elements 14 and 18 are aligned on a second axis which is perpendicular to the first. The elements 12 and 16 are oppositively positioned in the array as are the elements 14 and 18. It follows that the elements 14 and 18 are each adjacent to the element 12 and to the element 16. Likewise the elements 12 and 16 are each adjacent to the element 14 and to the element 18. The illustrated antenna system is particularly suited for use in airborne collision avoidance systems, such as TCAS. It can be used to both transmit the interrogation signal to the target aircraft and receive the response signal from the target aircraft.

A transmitter 20 supplies power selectively to each element 12, 14, 16 and 18, preferably at 1030 MHz. In a preferred embodiment, the 1030 MHz transmitter 20 output is input to a programmable power divider 22. The divider 22 has four outputs, each of the four outputs being connected to one of four isolators 24, 26, 28 and 30 at a first terminal. The divider 22 supplies a selectable amount of power from the transmitter 20 to each of the four isolators 24, 26, 28 and 30. The first isolator 24, has a second terminal connected to the element 12 through a cable 32. Although only a single cable 32 is indicated it can actually represent many cables, for example, all the cables between the isolator 24 and the antenna element 12. The component 32 can also represent any other components which might delay the phase of a signal. The isolator 26 has a second terminal connected to the element 14 through a phase shifter 34 and the cables 36. The isolator 28 has a second terminal connected to the element 16 through the phase shifter 38 and the cables 40. The isolator 30 has a second terminal connected to the element 18 through the phase shifter 42 and the cables 44.

Further associated with the transmit system in accordance with the present invention is a phase detector 46. One input to the phase detector is connected to the output of the transmitter 20 by means of a pickoff unit 48. The unit 48 supplies a signal indicative of the Phase of the transmitter 20 output to the phase detector 46. A second input to the phase detector 46 is supplied by a signal received from one of the elements 12, 14, 16 or 18. The signal at the second input of the phase detector 46 is supplied through an output of a switch 50. The switch 50 has four inputs, each of which are connected to one of the four isolators 24, 26, 28 or 30 at a third terminal. Each isolator 24, 26, 28 and 30 can connect the second terminal to either the first or the third terminal. Each of the elements 12, 14, 16 and 18, therefore, is selectively connectable to either the transmitter 20 or the second input of the phase detector 46 by the aPpropriate control of the isolators 24, 26, 28 and 30 and the switch 50.

The signal path to and from each element 12, 14, 16 and 18 and the electronic components therein is collectively referred to as a channel. The transmit system of FIG. 1, therefore, has four channels. In accordance with the present invention, at least three of the channels includes an in-line programmable phase shifter. A controller 51 is provided to control the phase shifters 34, 38 and 42 by the control lines 52, 54 and 56, respectively.

FIG. 2 illustrates the various directional beams which can be developed by the transmit system of FIG. 1. It is preferred to use directional beams in TCAS to improve control of the interrogation of target aircraft. These beams include a forward beam having a footprint 100, a right beam having a footprint 102, an aft beam having a footprint 104, a left beam having a footprint 106 and an omni beam having a footprint 108. The beam which is transmitted depends upon how the power and Phase from the transmitter 20 is distributed to each element 12, 14, 16 and 18 by the programmable power divider 22. For example, to derive the forward beam 100, a first amount of energy and a first phase is supplied to the element 12, a second amount of energy and a second phase to the element 16 and a third amount of energy and a third phase to each of the elements 14 and 18. The particular quantities of energy and phase are dependent on the desired beam pattern.

Each phase must be referenced to the antenna elements regardless of channel differences due to cables. The results of the calibration method of the present invention are utilized to accomplish this. For example, the calibration results are added to the above first, second and third phases to steer the beam to obtain a proper forward beam 100.

In transmit systems of the type illustrated in FIGS. 1 and 2, wherein beam patterns are controlled by varying the amplitude and phase of the signals at the antenna elements, it is particularly important that the phase of a signal from the transmitter 20 at each of the antenna elements 12, 14, 16 and 18 be the same. In such systems, however, differences in the phase delays caused by the cables 32, 36, 40 and 44 as well as differences in the phase delay of the various electronic components, for example, the programmable power divider 22, result in phase differences in the transmitted signal at each of the elements 12, 14, 16 and 18. These phase differences should be calibrated out for optimal performance of the transmit system.

Figure 3:
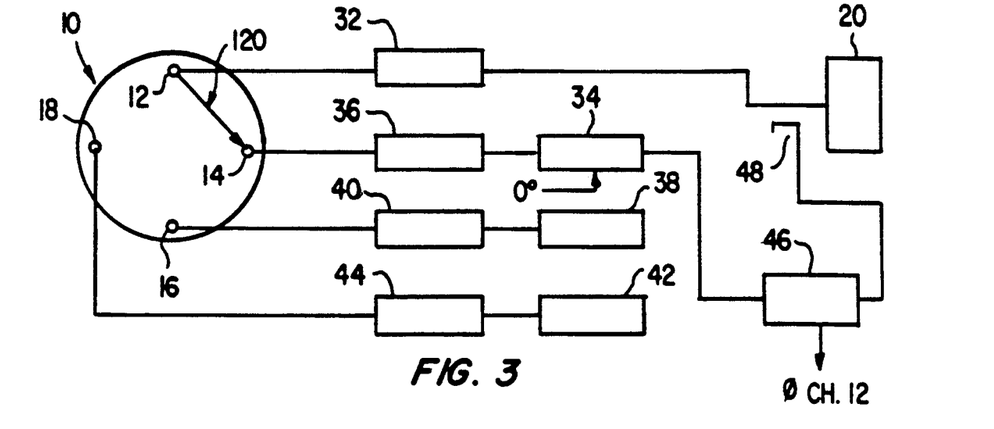
FIGS. 3–14 illustrate the configuration of the system of FIG. 1 during each step performed in accordance with a preferred method of calibrating the transmit system.

The method of the present invention to calibrate these differences, in general, is a multi-step process wherein the relative phase delays in each channel are determined and canceled by the appropriate control of the phase shifters 34, 38 and 42 on the control lines 52, 54 and 56, respectively. The preferred steps in the process are now discussed with reference to FIGS. 3-12. In this discussion, the transmission path to and from the element 12 through the associated electronics and cables is referred to as channel 1. Similarly, the transmission paths to and from each of the elements 14, 16 and 18 through the associated components and cables are referred to as channels 2, 3 and 4, respectively. The first four steps involve finding the phase difference, $\Delta\phi_{13}$, between channels 1 and 3. Referring to FIG. 3, the first step in the calibration process is illustrated. The elements 14, 16 and 18 are isolated from the transmitter 20 by the isolators 26, 28 and 30, respectively, which are not illustrated in FIG. 3. The element 14 is connected to the phase detector 46 through the cables 36, the phase shifter 34, the isolator 26 (see FIG. 1) and the switch 50 (see FIG. 1). The power is transmitted from the element 12 as electromagnetic waves. Some of the transmitted power 120 is received by the element 14 which transmits the received power through the cables 36 and the phase shifter 34 to the phase detector 46. The phase shifter 34 is programmed on the control line 52 to shift the received signal by 0°. The phase detector 46, therefore, outputs the relative phase difference between channel 1 and channel 2. In particular, the relative phase shift caused by the cables 32 and the cables 36 is determined. This relative phase difference, $\phi_{ch12}$, is determined in accordance with the following equation:

$$\phi_{ch12} = \phi_{ref} - [\phi_{32} + (\phi_{12} - \phi_{14}) + \phi_{36}]$$

wherein $\phi_{ref}$ is the phase of the signal at the transmitter 20, $\phi_{32}$ is the phase delay in the cables 32, $\phi_{12}$ minus $\phi_{14}$ is the phase delay in the signal transmitted by the element 12 and the signal received by the element 14, and $\phi_{36}$ is the phase delay in the cables 36. The result, $\phi_{ch12}$, is stored in memory.

Figure 4:
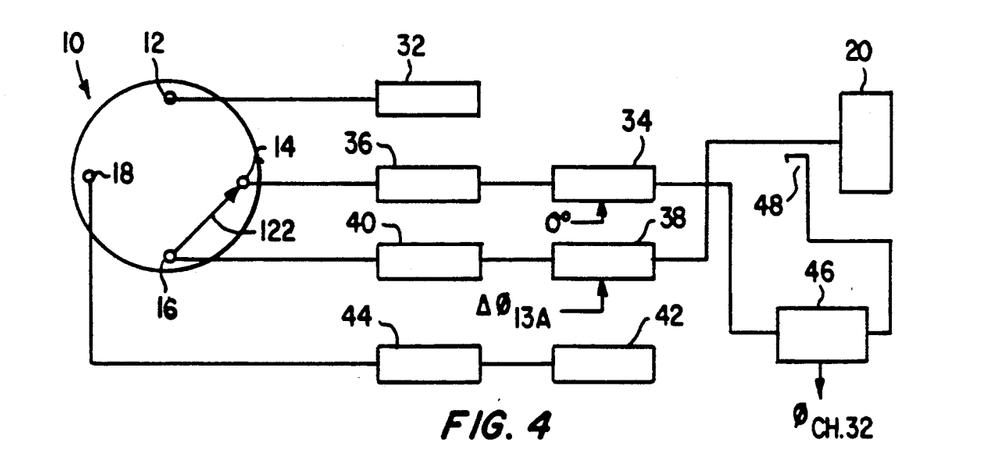

In the second step, as illustrated in FIG. 4, the element 16 is transmitting a signal and the element 14 is receiving a portion 122 of the transmitted signal. The elements 12, 14 and 18 are, therefore, isolated from the transmitter 20 and the element 14 is connected to the phase detector 46 through various components. The phase shifter 34 is controlled so as to shift the signal it receives by 0°. The phase detector 46, therefore, determines the relative phase of the channels 2 and 3. This relative phase, $\phi ch32$, is determined in accordance with the following equation:

$$\phi_{ch32} = \phi_{ref} - [\Delta\phi_{13A} + \phi_{40} + (\phi_{16} - \phi_{14}) + \phi_{36}]$$

wherein $\phi_{ref}$ is the phase of the signal at the transmitter 20, $\phi_{40}$ is the phase delay associated with cable 40, $\phi_{16}$ minus $\phi_{14}$ is the phase delay between the signal transmitted by the element 16 and the signal received by the element 14, and $\phi_{36}$ is the phase delay associated with the cable 36.

The phase delay $\Delta\phi_{13A}$ is the phase delay of the phase shifter 38, as controlled on the line 54. The phase delay $\Delta\phi_{13A}$ is varied while the element 16 is transmitting until $\phi_{ch32}$ equals the result from step one, $\phi_{ch12}$. The phase delay $\Delta\phi_{13A}$ is then equal to the phase difference between the cables 32 and the cables 40. This result is stored.

Figure 5:
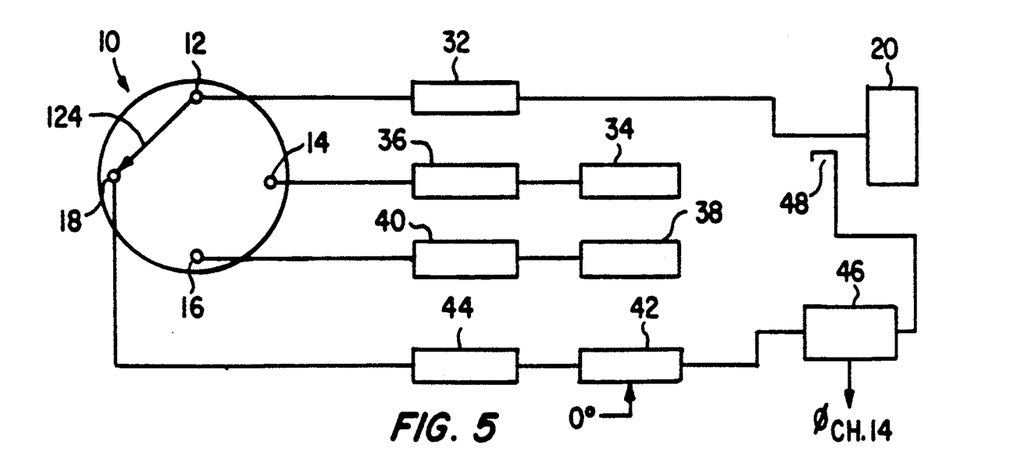

FIG. 5 illustrates the third step wherein the element 12 transmits a signal, a portion 124 of which is received by the element 18. The elements 14, 16 and 18 are, therefore, isolated from the transmitter and the element 18 is connected to the phase detector 46 through various components. The phase shifter 42 is controlled so as to shift the signal it receives by 0°. The phase detector 46, therefore, determines the relative phase difference $\phi_{ch14}$ between channels 1 and 4. This is determined in accordance with the following equation:

$$\phi_{ch14} = \phi_{ref} - [\phi_{32} + (\phi_{12} - \phi_{18}) + \phi_{44}]$$

wherein $\phi_{ref}$ is the phase of the signal at the transmitter 20, $\phi_{32}$ is the phase delay caused by the cable 32, $\phi_{18}$ minus $\phi_{12}$ is the phase delay in the signal transmitted by the element 12 and the signal received by the element 18, and $\phi_{44}$ is the phase delay caused by the cable 32. The result, $\phi_{ch14}$, is stored.

Figure 6:
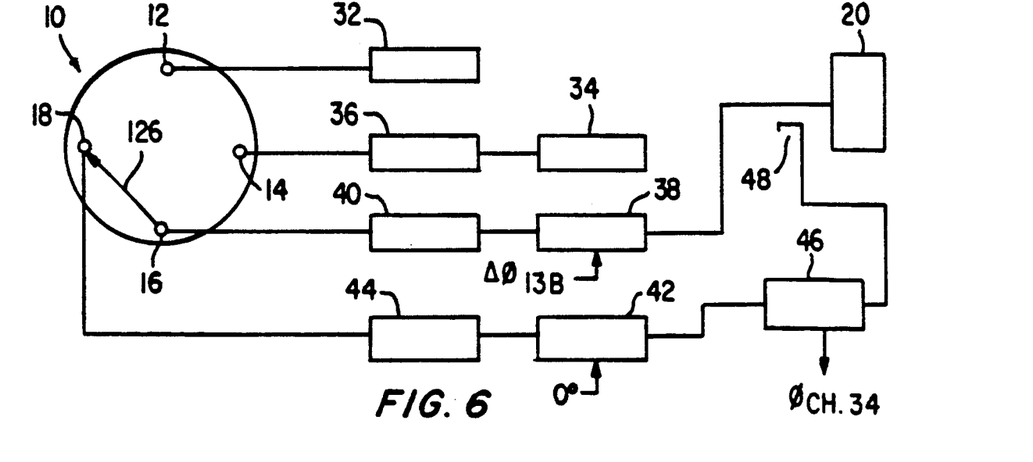

In step four, as illustrated in FIG. 6, the signal from the transmitter 20 is transmitted by the element 16 and a portion 126 of the transmitted signal is received by the element 18. The elements 12, 14 and 18 are, therefore, isolated from the transmitter 20 and element 18 is connected to the phase detector 46. The phase shifter 42 is controlled so as to shift the signal it receives b 0°. The phase detector 46, therefore, determines the relative phase of the channels 3 and 4. This relative phase, $\phi_{ch34}$, is determined in accordance with the following equation:

$$\phi_{ch34} = \phi_{ref} - [\Delta\phi_{13B} + \phi_{40} + (\phi_{16} - \phi_{18}) + \phi_{44}]$$

wherein $\phi_{ref}$ is the phase of the signal at the transmitter 20, $\phi_{40}$ is the phase delay caused by the cable 40, $\phi_{16}$ minus $\phi_{18}$ is the phase delay between the signal transmitted by the element 16 and the signal received by the element 18, and $\phi_{44}$ is the phase delay associated with the cable 44.

The phase delay, $\Delta\phi_{13B}$, is the phase delay of the phase shifter 38. The phase delay, $\Delta\phi_{13B}$, is varied until $\phi_{ch34}$ equals $\phi_{ch14}$. Then $\Delta\phi_{13B}$ equals the phase difference between the cables 32 and the cables 40. This value is stored in memory.

There are two values for the phase difference between the cables 32 and 40 stored in memory. The midpoint between the two values is calculated as follows:

$$\Delta\phi_{13} = (\Delta\phi_{13A} + \Delta\phi_{13B})/2$$

which equals the average phase difference. This number is stored.

Figure 7:
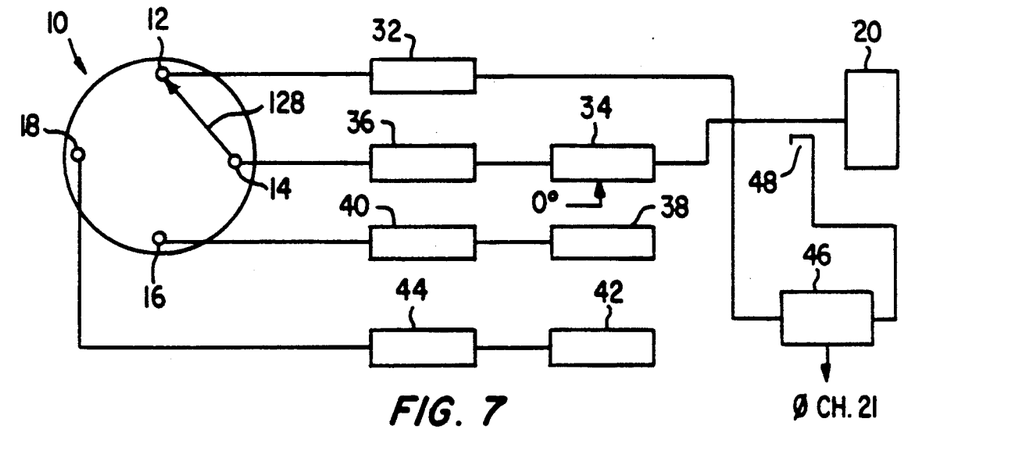

FIG. 7 illustrates step five. The element 14 is transmitting the signal from the transmitter 20 to the element 12. The element 12 receives a portion 128 of the transmitted signal. The elements 12, 16 and 18 are, therefore, isolated from the transmitter 20 and the element 12 is connected to the phase detector 46. A Phase shift of 0° is entered into the phase shifter 34. The relative phase difference between channels 1 and 2, $\phi_{ch12}$, is output by the phase detector 46. This is reflected in the following equation:

$$\phi_{ch12} = \phi_{ref} - [\phi_{36} + (\phi_{14} - \phi_{12}) + \phi_{32}]$$

wherein $\phi_{ref}$ is the phase of the signal at the transmitter, $\phi_{36}$ is the phase delay caused by the cables 36, $\phi_{14}$ minus $\phi_{12}$ is the phase difference between the signal transmitted by the element 14 and the signal received by the element 12 and $\phi_{32}$ is the phase delay of the cables 32. This result is stored.

Figure 8:
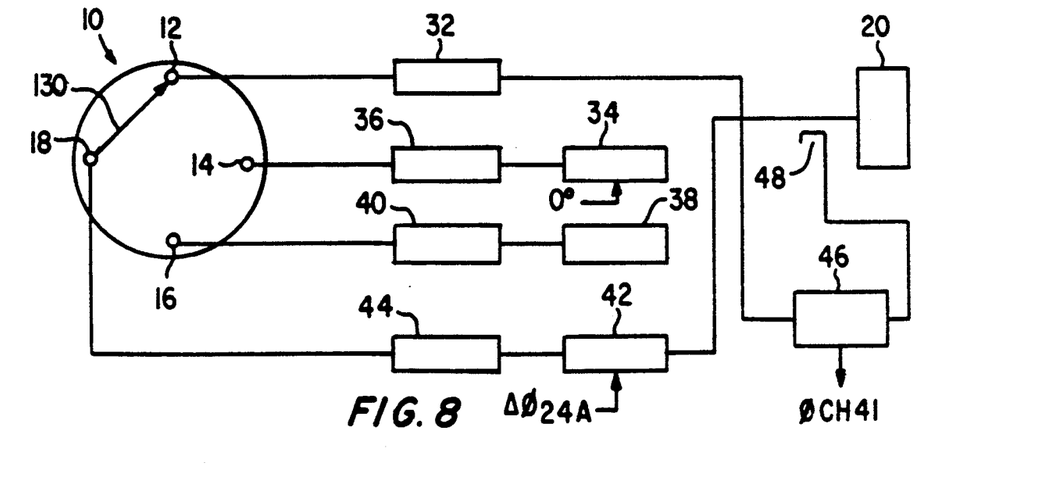

In step six, as illustrated in FIG. 8, the element 18 transmits a signal from transmitter 20. The element 12 receives a portion 130 of the transmitted signal. The elements 12, 14 and 16 are, therefore, isolated from the transmitter 20 and the element 12 is connected to the phase detector 46. The phase detector 46, therefore, measures the phase difference between channels 1 and 4. This is reflected in the following equation:

$$\phi_{ch14} = \phi_{ref} - [\Delta\phi_{24A} + \phi_{44} + (\phi_{18} - \phi_{12}) + \phi_{32}]$$

wherein $\phi_{ref}$ is the phase of the signal at the transmitter 20, $\phi_{44}$ is the phase delay of the cables 44, $\phi_{18}$ minus $\phi_{12}$ is the phase difference of the signal transmitted by the element 18 and the signal received by the element 12, and $\phi_{32}$ is the phase delay of the cables 32. The phase delay $\Delta\phi_{24A}$ of the phase shifter 42 is varied until $\phi_{ch14}$ equals $\phi_{ch12}$ and is stored. The phase detector 46 output is also stored.

Figure 9:
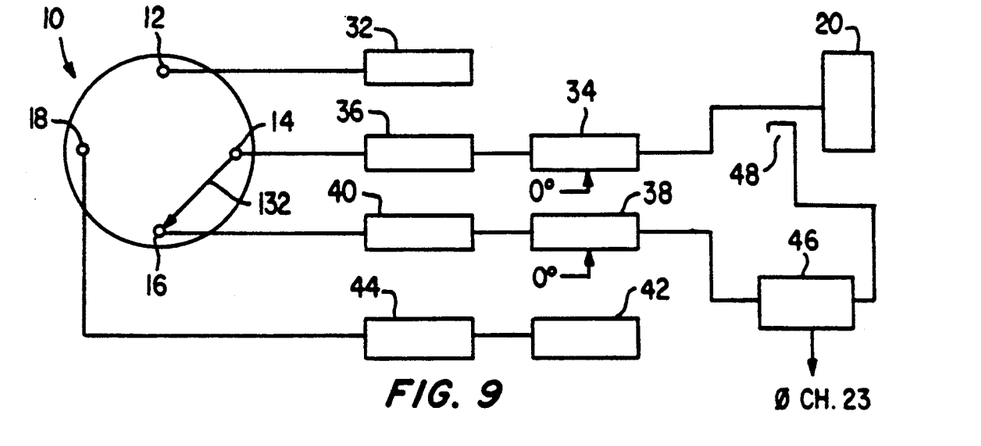

In step seven, illustrated in FIG. 9, the element 14 transmits a signal, a portion 132 of which is received by the element 16. The elements 12, 16 and 18, therefore, are isolated from the transmitter 20 and the element 16 is connected to the phase detector 46. The phase shifters 34 and 38 are both programmed to shift the signals they receive by 0°. The phase detector 46, therefore, measures the phase difference between channels 2 and 3. This is reflected in the following equation:

$$\phi_{ch23} = \phi_{ref} - [\phi_{36} + (\phi_{14} - \phi_{16}) + \phi_{40}]$$

wherein $\phi_{ref}$ is the phase of the signal at the transmitter 20, $\phi_{36}$ is the phase delay caused by the cables 36, $\phi_{14}$ minus $\phi_{16}$ is the phase difference between the signal transmitted by the element 14 and the signal received by the element 16 and $\phi_{40}$ is the phase delay of the cables 40. The result $\phi_{ch23}$ is stored.

Figure 10:
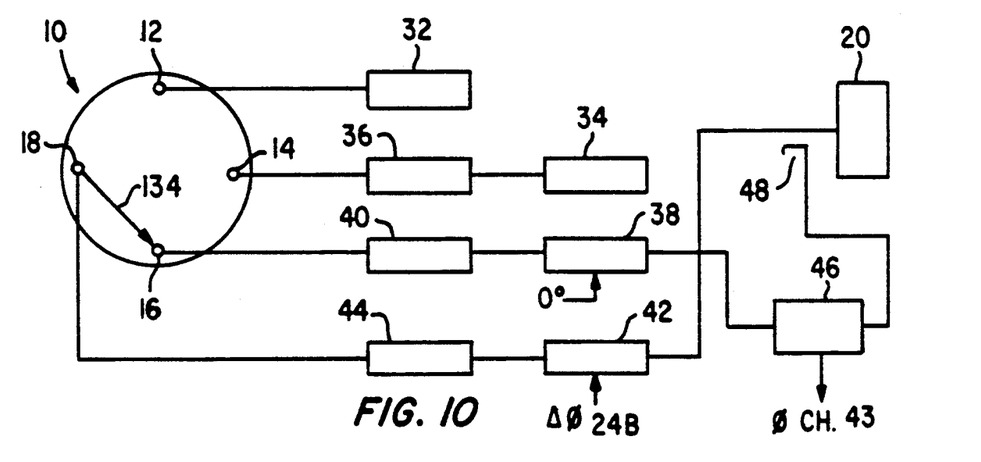

In step eight, as illustrated in FIG. 10, the element 18 is transmitting a signal. The element 16 receives a portion 134 of the transmitted signal. The elements 12, 14 and 16, therefore, are isolated from the transmitter 20 and the element 16 is connected to the phase detector 46. A delay of 0° is programmed into the phase shifter 38. The phase detector 46 measures the phase difference between channels 3 and 4 in accordance with the following equation:

$$\phi_{ch43} = \phi_{ref} - [\Delta\phi_{24B} + \phi_{44} + (\phi_{18} - \phi_{16}) + \phi_{40}]$$

wherein $\phi_{ref}$ is the phase of the signal at the transmitter 20, $\phi_{44}$ is the phase delay of the cables 44, $\phi_{18}$ minus $\phi_{16}$ is the phase difference between the signal transmitted by the element 18 and the signal received by the element 16 and $\phi_{40}$ is the phase delay of the cables 40. $\Delta\phi_{24B}$ is the phase delay programmed into the phase shifter 42. $\Delta\phi_{24B}$ is varied until $\phi_{ch43}$ equals $\phi_{ch23}$. The average phase difference between channels 3 and 4 is then determined as the average of the results from steps six and eight. Therefore, $$\Delta\phi_{24} = (\Delta\phi_{24A} + \Delta\phi_{24B})/2.$$

Figure 11:
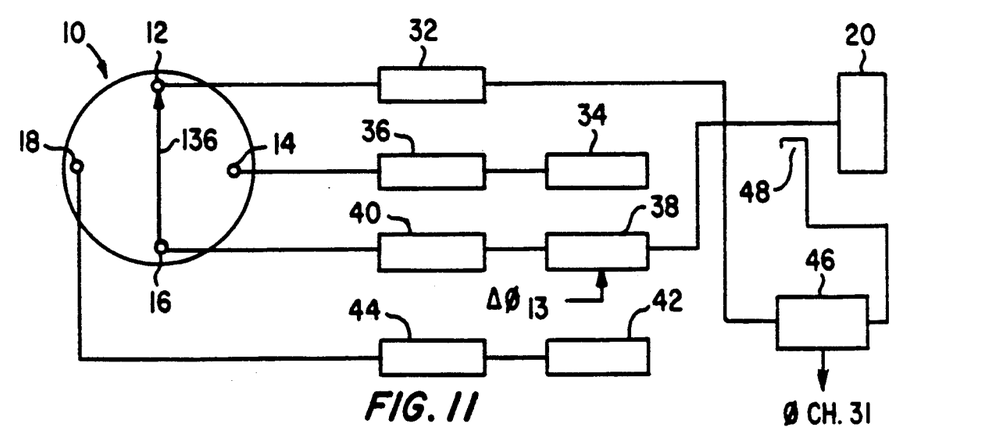

In step nine, as illustrated in FIG. 11, the element 16 transmits a signal. A portion 136 of the signal is received by the element 12. The elements 12, 14 and 18 are, therefore, isolated from the transmitter 20 and the element 12 is connected to the phase detector 46. The average phase difference, $\Delta\phi_{13}$, between the channels 1 and 3 is programmed into the phase shifter 38. The output of the phase detector, $\phi_{ch31}$, is:

$$\phi_{ch31} = \phi_{ref} - [\Delta\phi_{13} + \phi_{40} + (\phi_{16} - \phi_{12}) + \phi_{32}]$$

wherein $\phi_{ref}$ is the phase of the signal at the transmitter 20, $\phi_{40}$ is the phase delay of the cables 40, $\phi_{16}$ minus $\phi_{12}$ is the phase difference between the signal transmitted by the element 16 and the signal received by the element 12 and $\phi_{32}$ is the phase delay of the cables 32. The phase detector 46 output is stored.

Note, however, that by inserting the phase delay $\Delta\phi_{13}$ into the phase shifter 38, the phase delays in channels 1 and 3 are approximately equaled. Therefore, $$\phi_{32} = \phi_{40} + \Delta\phi_{13}$$

The equation for $\phi_{ch31}$ can, therefore, be rewritten as:

$$\phi_{ch31} = \phi_{ref} - [2\phi_{32} + (\phi_{16} - \phi_{18})]$$

Figure 12:
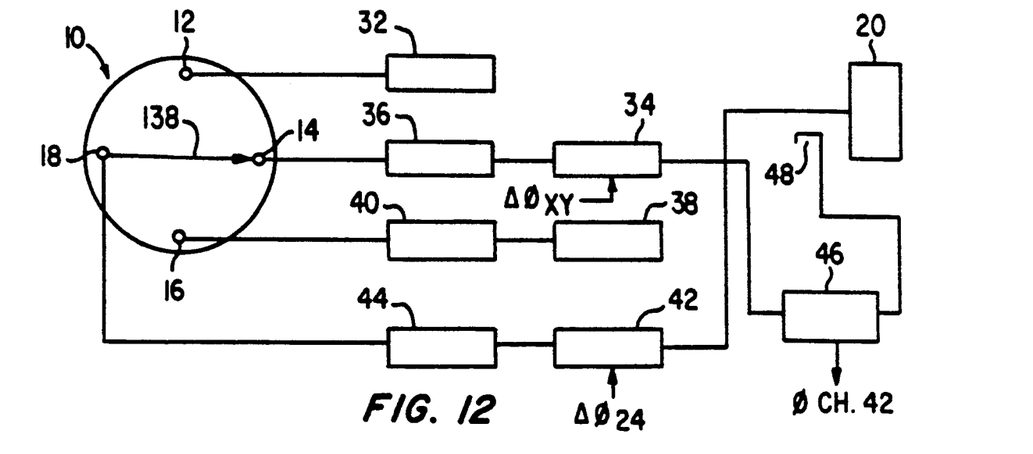

In step ten, as illustrated in FIG. 12, the element 18 transmits a signal. A portion 138 of the signal is received by the element 14. The elements 12, 14 and 16 are, therefore, isolated from the transmitter 20 and the element 14 is connected to the phase detector 46. The average phase shift $\Delta\phi_{24}$ is programmed into the phase shifter 42. The phase detector output 46, therefore, is:

$$\phi_{ch42} = \phi_{ref} - [\Delta\phi_{24} + \phi_{44} + (\phi_{18} - \phi_{14}) + \phi_{36} + \Delta\phi_{xy}]$$

wherein $\phi_{ref}$ is the phase of the signal at the transmitter 20, $\phi_{xy}$ is the phase delay caused by the cables 44, $\phi_{18}$ minus $\phi_{14}$ is the phase difference between the signal transmitted by the element 18 and the signals received by the element 14 and $\phi_{36}$ is the phase delay caused by the cables 36. The phase $\Delta\phi_{xy}$ is the phase delay pro-grammed into the phase shifter 34. This value is varied until $\phi_{ch31}$ equals $\phi_{ch42}$ and the value is stored.

By inserting $\Delta\phi_{14}$ into the phase shifter 42, the phase difference between channels 2 and 4 is made approximately equal, so that:

$$\phi_{36} = \phi_{xy} + \Delta\phi_{24}$$

The equation for $\Delta\phi_{ch42}$ can, therefore, be rewritten as:

$$\phi_{ch42} = \phi_{ref} - [2\phi_{36} + (\phi_{18} - \phi_{14}) + \Delta\phi_{xy}]$$

Since $\phi_{ch31}$ equals $\phi_{ch42}$, and since $\phi_{16}$ minus $\phi_{12}$ approximately equals $\phi_{18} - \phi_{14}$ due to the symmetry of the array 10, the following results:

$$2\phi_{32}2\phi_{36} + \Delta\phi_{xy}$$

$$\phi_{32} = \phi_{36} + \Delta\phi_{xy}/2$$

so that the phase difference between opposite element pairs is $\Delta\phi_{xy}/2$.

When a collision avoidance signal is to be transmitted, the following phase shifts are entered into the phase shifters: into the phase shifter 34 insert a delay of $\Delta\phi_{xy}/2$, into the phase shifter 38 insert a delay of $\Delta\phi_{13}$ and into the phase shifter 42 insert a delay of $\Delta\phi_{24} + \Delta\phi_{xy}/2$.

The preferred method as illustrated in FIGS. 3 to 12 shows the transmission paths in one direction. The present invention can be practiced with the transmitted signal going in either direction. For example, in step one (FIG. 3), the illustrated transmission is from the element 12 to the element 14, however, the direction could be reversed.

It is further preferred to perform two more steps It is remotely possible that the phase delays between two opposite cables differ by 180°, in which case there would be an ambiguity. To account for this possibility, steps eleven and twelve are performed as follows.

Figure 13:
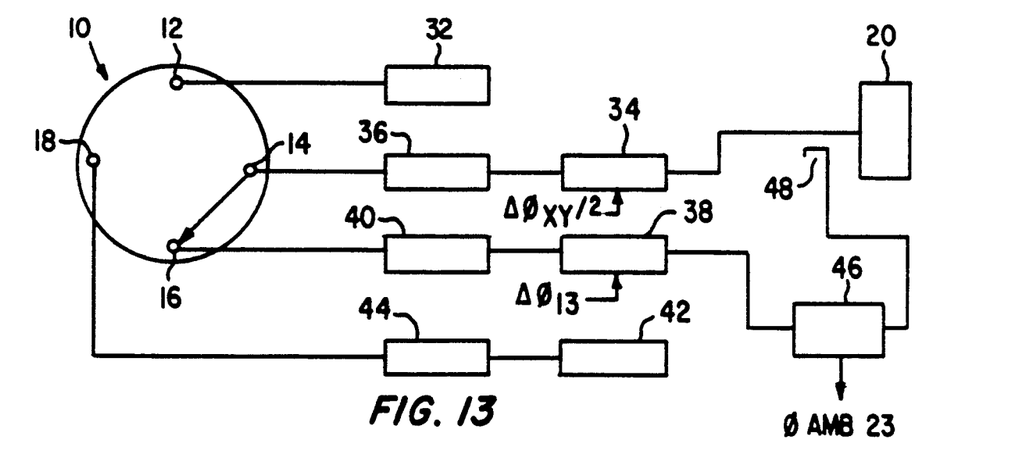

In step eleven, as illustrated in FIG. 13, the phase shifts determined for use with the collision avoidance signal, as described above, are entered as necessary into the respective channels. Then the element 14 is connected to the transmitter 20 and the element 16 is connected to the phase detector 46. The phase detector output $\phi_{AMB23}$ is stored.

Figure 14:
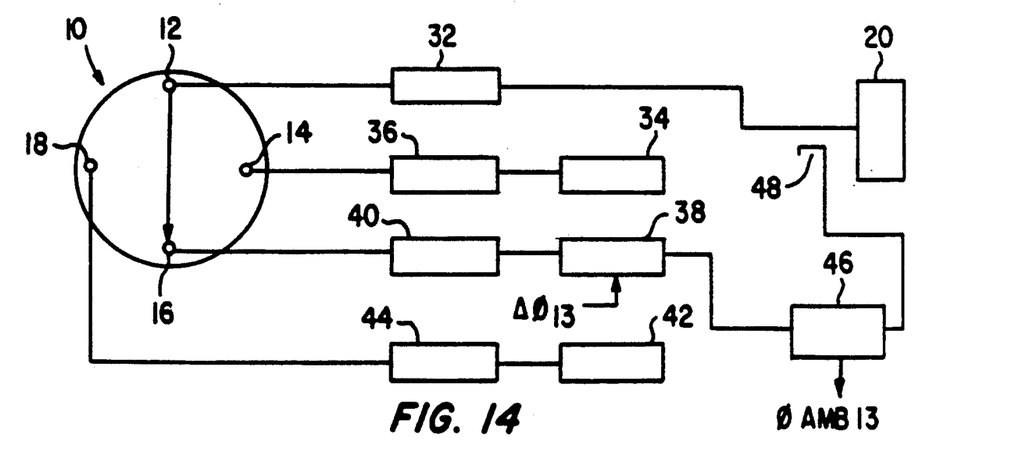

In step twelve, as illustrated in FIG. 14, the phase shifts determined for use with the collision avoidance signal are again entered into the respective channels as necessary. The element 12 is connected to the transmitter 20 and the element 16 is connected to the phase detector 46. The phase shift of the phase shifter 38 is varied from the set value such that the phase detector output $\phi_{AMB13}$ is equal to $\phi_{AMB23}$ which was previously stored.

The resulting variation is equal to the difference between $\phi_{AMB23}$ and $\phi_{AMB13}$. This result is compared to a constant. If the result is within a predetermined range of the constant, the phase shifts determined in accordance with steps one through ten are used with the collision avoidance signal. On the other hand, if the result is outside the predetermined range, then 180° is added to the phase shifts entered into the phase shifters 34 and 42. The phase shifts used within the collision avoidance signal, therefore, would be as follows; $\Delta\phi_{xy}/2 + 180°$ into the phase shifter 34, $\Delta\phi_{13}$ into the phase shifter 38 and $\Delta\phi_{24} + \Delta\phi_{xy}/2 + 180°$ into the phase shifter 42.

In the ambiguity steps, the result from the subtraction should be the actual phase difference at the elements as the differential delays have been added. This result should be the same for any combination of adjacent elements (e.g. elements 14 and 16) and opposite elements (e.g. elements 12 and 16) and, therefore, any such combination of elements in the array 10 can be used to determine the ambiguities.

Furthermore, the first and second steps yield a relative phase difference between the channels 1 and 3 and the fifth and sixth steps yield a relative phase difference between the channels 2 and 4. These results can be used instead of the average values of the preferred embodiment. In that case, the calibration sequences would consist of the steps one, two, five, six, nine and ten. By the same reasoning, the third and fourth steps yield a relative phase difference between the channels 1 and 3 and the seventh and eighth steps yield a relative phase difference between between the channels 2 and 4 which can also be used instead of an average.

It is preferred to calibrate the transmit system at power up of the collison avoidance system, during a requested functional test and, at a minimum, every two minutes during system operation.

We claim:

1. A calibration method for a transmitter having a first, a second, a third and a fourth element circumferentially positioned with a 90 degree spacing in an antenna array such that the first and the third elements are oppositively positioned and the second and the fourth elements are oppositively positioned, the first, the second, the third and the fourth element being selectively connectable through a first, a second, a third and a fourth channel, respectively, of components to a transmitter or to a first input of a phase detector, the transmitter being connected to the second input of the phase detector, comprising the steps of:

determining the phase difference between a first and a third channel by transmitting a signal between the first element and a first element adjacent the first and third elements to obtain a first phase detector output, by transmitting the signal between the third element and the first element adjacent the first and third elements to obtain a second phase detector output and by inserting a first phase shift in the third channel such that the first and second phase detector outputs are equal;

determining the phase difference between a second and fourth channel by transmitting between the second element and a first element adjacent the second and fourth elements to obtain a third phase detector output, by transmitting between the fourth element and the element adjacent the second and fourth elements to obtain a fourth phase detector output and by inserting a second phase shift in the fourth channel such that the third and fourth phase detector outputs are equal;

transmitting between the first and third elements with the first phase shift inserted into the third channel to obtain a fifth phase detector output; and transmitting between the second and fourth elements with the second phase shift inserted into the fourth channel to obtain a sixth phase detector output and inserting a third phase shift in the second channel such that the fifth and sixth phase detector outputs are equal.

2. The method as claimed in claim 1, wherein the first element adjacent the first and third element is the second element or the fourth element and wherein the first element adjacent the second and fourth element is either the first element or the third element.

3. The method as claimed in claim 1, further comprising the steps of:

forming a fourth phase shift which is half the third phase shift; and forming a fifth phase shift which is the second phase shift plus the fourth phase shift.

4. The method as claimed in claim 3, further comPrising the step of:

transmitting a collision avoidance signal from the antenna array with the fourth phase shift inserted in the second channel, the first phase shift inserted in the third channel and the fifth phase shift inserted into the fourth channel.

5. The method as claimed in claim 1, wherein the phase difference between first and third channel is determined by transmitting from the first and third elements and the phase difference between the second and fourth channels is determined by transmitting from the second and elements.

6. The method as claimed in claim 1, wherein the phase difference between first and third channel is determined by transmitting to the first and third elements and the phase difference between the second and fourth channels is determined by transmitting to the second and elements.

7. The method as claimed in claim 1, further comprising the steps of:

determining the phase difference between the first and the third channel by transmitting a signal between the first element and a second element adjacent the first and third elements to obtain a seventh phase detector output, by transmitting the signal between the third element and the second element adjacent the first and third elements to obtain an eighth phase detector output and inserting a fourth phase shift in the third channel such that the seventh and eighth phase detector outputs are equal;

forming a fifth phase shift by averaging the first and fourth phase shifts;

determining the phase difference between the second and fourth channel by transmitting between the second element and a second element adjacent the second and fourth elements to obtain a ninth phase detector output, by transmitting between the fourth element and the second element adjacent the second and fourth elements to obtain a tenth phase detector output and inserting a sixth phase shift in the fourth channel such that the ninth and tenth phase detector outputs are equal;

forming a sixth phase shift by averaging the second and sixth phase shifts;

8. The method as claimed in claim 7, wherein the first element adjacent the first and third elements is one of the second and fourth elements, and the second element adjacent the first and third elements is the other of the second and fourth elements and the first element adjacent the second and fourth elements is one of the first and third elements and the second element adjacent the second and fourth elements is the other of the first and third elements.

9. The method as claimed in claim 8, further comprising the steps of:
forming a seventh phase shift which is half the third phase shift; and
forming an eighth phase shift which is the sixth phase shift plus the seventh phase shift.

10. The method as claimed in claim 9, further comprising the step of:
transmitting a collision avoidance signal from the four element antenna array with the seventh phase shift inserted in the second channel, the fifth phase shift inserted in the third channel and the eighth phase shift inserted into the fourth channel.

11. The method as claimed in claim 7, wherein the determination of the phase difference between the first and third channel is made by transmitting from the first and third elements and the determination of the phase difference between the second and fourth channel is made by transmitting from the second and fourth elements.

12. The method as claimed in claim 7, wherein the determination of the phase difference between the first and third channel is made by transmitting to the first and third elements and the determination of the phase difference between the second and fourth channel made by transmitting to the second and fourth elements.

* * * * *